(12) United States Patent
Lahr et al.

(10) Patent No.: US 11,387,712 B2
(45) Date of Patent: Jul. 12, 2022

(54) METHOD TO REDUCE OIL SHEAR DRAG IN AIRGAP

(71) Applicant: GM GLOBAL TECHNOLOGY OPERATIONS LLC, Detroit, MI (US)

(72) Inventors: Derek F. Lahr, Howell, MI (US); Farzad Samie, Franklin, MI (US); Alireza Fatemi, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 364 days.

(21) Appl. No.: 16/570,217

(22) Filed: Sep. 13, 2019

(65) Prior Publication Data
US 2021/0083555 A1 Mar. 18, 2021

(51) Int. Cl.
| | |
|---|---|
| H02K 9/26 | (2006.01) |
| H02K 7/00 | (2006.01) |
| H02K 9/19 | (2006.01) |
| B60K 1/00 | (2006.01) |

(52) U.S. Cl.
CPC .............. *H02K 9/26* (2013.01); *H02K 7/006* (2013.01); *H02K 9/19* (2013.01); *B60K 1/00* (2013.01); *B60Y 2400/60* (2013.01); *H02K 2201/03* (2013.01)

(58) Field of Classification Search
CPC .......... B60K 1/00; B60K 11/02; B60K 11/06; B60K 2001/006; H02K 2201/03; H02K 7/006; H02K 9/19; H02K 9/26; H02K 1/32; H02K 9/04; H02K 9/06; B60Y 2400/60

USPC .......................................................... 310/54
See application file for complete search history.

(56) References Cited

U.S. PATENT DOCUMENTS

| | | | | | |
|---|---|---|---|---|---|
| 2,917,644 | A | * | 12/1959 | Laffoon | H02K 9/00 310/64 |
| 3,388,559 | A | * | 6/1968 | Johnson | F25B 1/053 62/224 |
| 3,675,056 | A | * | 7/1972 | Lenz | H02K 9/20 310/54 |
| 3,867,658 | A | * | 2/1975 | Dochterman | H02K 11/40 310/71 |
| 4,418,777 | A | * | 12/1983 | Stockton | F16H 57/0413 184/6.12 |
| 4,649,307 | A | * | 3/1987 | Bech | H02K 49/00 310/83 |
| 5,769,069 | A | * | 6/1998 | Caffell | F04D 1/006 126/634 |
| 6,009,722 | A | * | 1/2000 | Choi | F04D 25/06 62/505 |
| 7,411,323 | B2 | * | 8/2008 | Pfannschmidt | H02K 1/32 310/58 |
| 2002/0192089 | A1 | * | 12/2002 | Hill | H02K 9/19 417/423.7 |
| 2003/0020339 | A1 | * | 1/2003 | Ide | H02K 9/12 310/58 |
| 2003/0161740 | A1 | * | 8/2003 | Kimberlin | F04C 14/06 417/365 |
| 2004/0084974 | A1 | * | 5/2004 | Nelson | H02K 9/06 310/58 |

(Continued)

*Primary Examiner* — Alex W Mok
(74) *Attorney, Agent, or Firm* — Quinn IP Law

(57) ABSTRACT

An electric motor includes a stator, a rotor, a rotor shaft and a pump. The rotor is disposed within the stator and separated from the stator by an airgap. The airgap inadvertently accumulates a fluid. The rotor shaft is connected to the rotor. The pump is configured to move the fluid out of the airgap.

20 Claims, 5 Drawing Sheets

(56) References Cited

U.S. PATENT DOCUMENTS

| | | | |
|---|---|---|---|
| 2006/0133919 A1* | 6/2006 | Dooley | F04D 29/181 415/75 |
| 2011/0109175 A1* | 5/2011 | Nijhuis | F04D 29/5806 310/58 |
| 2011/0298314 A1* | 12/2011 | Atarashi | H02K 7/006 310/54 |
| 2012/0104884 A1* | 5/2012 | Wagner | H02K 1/32 310/54 |
| 2012/0107151 A1* | 5/2012 | Yokoyama | F04C 23/02 417/366 |
| 2012/0274159 A1* | 11/2012 | Le Besnerais | H02K 9/22 310/54 |
| 2012/0286595 A1* | 11/2012 | Pal | H02K 9/197 310/54 |
| 2013/0119830 A1* | 5/2013 | Hautz | H02K 9/00 310/60 R |
| 2013/0221772 A1* | 8/2013 | Miyamoto | H02K 1/32 310/54 |
| 2013/0313928 A1* | 11/2013 | McKinzie | H02K 9/19 310/54 |
| 2014/0265657 A1* | 9/2014 | Raczek | H02K 9/19 310/54 |
| 2015/0061424 A1* | 3/2015 | Mogi | H02K 9/19 310/54 |
| 2016/0047382 A1* | 2/2016 | Torii | H02K 1/278 417/420 |
| 2016/0053769 A1* | 2/2016 | Mizukami | F04D 5/001 417/423.14 |
| 2016/0190878 A1* | 6/2016 | Saari | H02K 9/04 310/59 |
| 2018/0038388 A1* | 2/2018 | Mizukami | F04D 29/642 |
| 2018/0083509 A1* | 3/2018 | Yang | H02K 1/274 |

\* cited by examiner

METHOD TO REDUCE OIL SHEAR DRAG IN AIRGAP

INTRODUCTION

Oil from lubricating circuits and cooling circuits commonly works into airgaps of electric motors in electric vehicles. Because of small airgap thicknesses in the electric motors, high rotational speeds, and large rotor diameters, the oil introduces drag that penalizes fuel economy of the vehicles. At a vehicle speed of 80 miles per hour, over 600 watts of energy can be lost to airgap oil shear. A centrifugal effect of the rotors is usually not enough to remove all the oil.

What is desired is a way of displacing the oil that remains in the airgaps. A way of cooling the stators and the rotors is also desired.

SUMMARY

An electric motor is provided herein. The electric motor comprises a stator, a rotor, a rotor shaft and a pump. The rotor is disposed within the stator, and separated from the stator by an airgap, wherein the airgap inadvertently accumulates a fluid. The rotor shaft is connected to the rotor. The pump is configured to move the fluid out of the airgap.

In one or more embodiments of the electric motor, the pump is an air pump configured to force air into the airgap through the rotor to move the fluid out of the airgap.

In one or more embodiments of the electric motor, the pump is an air pump configured to force air into the airgap through the stator to move the fluid out of the airgap.

In one or more embodiments of the electric motor, the pump is driven by the rotor.

In one or more embodiments of the electric motor, the rotor comprises a plurality of rotor grooves disposed around a circumference of the rotor proximate at least one end of the rotor, the pump comprises a kinetic pump formed by the rotor and the plurality of rotor grooves, and the plurality of rotor grooves are configured to move the fluid out of the airgap.

In one or more embodiments of the electric motor, the stator comprises a plurality of stator grooves disposed around an inner surface of the stator proximate at least one end of the stator, the pump comprises a kinetic pump formed by the rotor and the plurality of stator grooves, and the plurality of stator grooves are configured to move the fluid out of the airgap.

In one or more embodiments of the electric motor, the rotor comprises a plurality of rotor blades disposed on at least one end of the rotor proximate the airgap, and the plurality of rotor blades are configured to push the fluid away from the electric motor.

In one or more embodiments of the electric motor, the fluid comprises an oil.

In one or more embodiments of the electric motor, the electric motor forms part of a vehicle.

An electric motor is provided herein. The electric motor comprises a stator, a rotor, a rotor shaft and an air pump. The rotor is disposed within the stator, and is separated from the stator by an airgap, wherein the airgap inadvertently accumulates a fluid. The rotor shaft is connected to the rotor. The air pump is configured to force air into the airgap, wherein the air forced into the airgap moves the fluid out of the airgap.

In one or more embodiments of the electric motor, the rotor shaft has an airway, and the air pump comprises a centrifugal fan disposed in the rotor, in fluid communication between the airway of the rotor shaft and the airgap, and configured to force the air from the airway of the rotor shaft into the airgap.

In one or more embodiments of the electric motor, the rotor shaft has an airway, the rotor has at least one rotor air line in fluid communication between the airway of the rotor shaft and the airgap, and the air pump comprises a fixed displacement pump driven by the rotor shaft, in fluid communication with the airway of the rotor shaft, and configured to force the air through the airway of the rotor shaft and the at least one rotor air line of the rotor into the airgap.

In one or more embodiments of the electric motor, the stator comprises at least one stator air line in fluid communication with the airgap, and the air pump comprises a fixed displacement pump driven by the rotor shaft, in fluid communication with the at least one stator air line, and configured to force the air through the at least one stator air line of the stator into the airgap.

In one or more embodiments of the electric motor, the rotor has at least one rotor air line in fluid communication with the airgap, the rotor shaft has an axis of rotation, at least one rotor shaft air line radially displaced from the axis of rotation, and the at least one rotor shaft air line is in fluid communication with the at least one rotor air line, and the air pump comprises a fixed displacement pump driven by the rotor shaft, in fluid communication with the rotor shaft air line, and configured to force the air through the at least one rotor shaft air line of the rotor shaft and the at least one rotor air line of the rotor into the airgap.

In one or more embodiments of the electric motor, the electric motor forms part of a vehicle, and the fluid comprises an oil.

In one or more embodiments of the electric motor, the rotor comprises at least one of a plurality of rotor grooves and a plurality of rotor blades, the plurality of rotor grooves are disposed around a circumference of the rotor proximate at least one end of the rotor, and the plurality of rotor grooves are configured to move the fluid out of the airgap while the rotor is rotating, the plurality of rotor blades are disposed on at least one end of the rotor proximate the airgap, and the plurality of rotor blades are configured to push the fluid away from the electric motor while the rotor is rotating, and the stator comprises a plurality of stator grooves disposed around an inner surface of the stator proximate at least one end of the stator, and the plurality of stator grooves are configured to move the fluid out of the airgap while the rotor is rotating.

An electric motor is provided herein. The electric motor comprises a stator, a rotor, a rotor shaft and a kinetic pump. The rotor is disposed within the stator, and separated from the stator by an airgap, wherein the airgap inadvertently accumulates a fluid. The rotor shaft is connected to the rotor. The kinetic pump is driven by the rotor shaft, and is configured to move the fluid out of the airgap.

In one or more embodiments of the electric motor, the kinetic pump is formed by the rotor and a plurality of rotor grooves, the plurality of rotor grooves are disposed around a circumference of the rotor proximate at least one end of the rotor, and the plurality of rotor grooves are configured to move the fluid out of the airgap while the rotor is rotating.

In one or more embodiments of the electric motor, the kinetic pump is formed by the rotor and a plurality of stator grooves, the plurality of stator grooves are disposed around an inner surface of the stator proximate at least one end of the stator, and the plurality of stator grooves are configured to move the fluid out of the airgap while the rotor is rotating.

In one or more embodiments of the electric motor, the rotor comprises a plurality of rotor blades disposed around a circumference of the rotor proximate at least one end of the rotor, and the plurality of rotor blades are configured to push the fluid away from the electric motor while the rotor is rotating.

In one or more embodiments of the electric motor, the electric motor forms part of a vehicle, and the fluid is an oil.

The above features and advantages and other features and advantages of the present disclosure are readily apparent from the following detailed description of the best modes for carrying out the disclosure when taken in connection with the accompanying drawings.

DETAILED DESCRIPTION

Embodiments of the disclosure generally provide pumping air into an airgap of an electric motor as a way of displacing a fluid (e.g., an oil or a coolant) deposited in the airgap. The air may be pumped via one or more of several mechanisms. The air has an additional benefit of cooling the stator and rotor. The air may be pumped into the middle (axially) of the electric motor so as to push the fluid out of the airgap at either end. In various embodiments, the air pump may be implemented as a centrifugal fan disposed in a rotor of the electric motor. In some embodiments, the air pump may be implemented as fixed displacement pump attached at either end of the rotor to pump the air into airgap. In still other embodiments, the air pump may be a separate air compressor to pump the air into airgap from the stator side. Combinations of multiple air pumps may also be implemented to increase an amount of air moved into the airgap.

In various embodiments of the disclosure, the pump may be a kinetic pump that moves the fluid out of the airgap. The kinetic pump generally imparts energy to the fluid which is subsequently directed to a discharge location. The kinetic pump may be formed by a rotor and multiple curved grooves. The curved grooves may be formed in the rotor and act as an axial impeller to move the fluid away from the airgap. The fluid may be discharged out one or both ends of the electric motor. In some embodiments, the grooves may be formed in a stator. Fluid forced against the stator by the motion of the rotor may be moved out of the airgap due to a curvature of the grooves. The fluid may subsequently be discharged out one or both ends of the electric motor.

Figure 1:
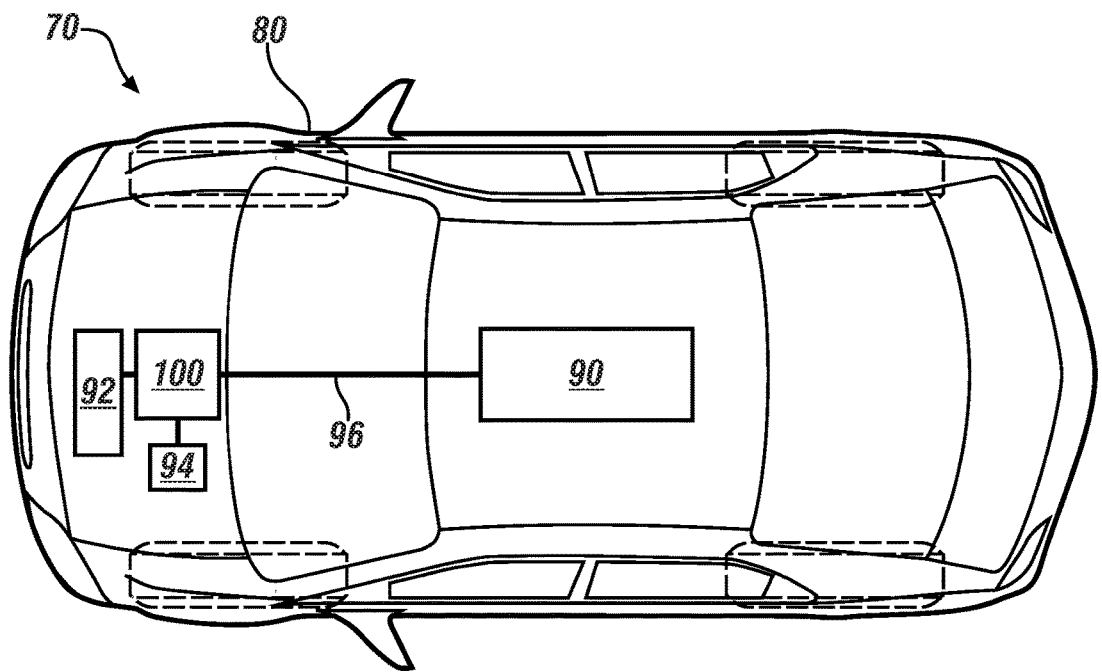
FIG. 1 is a schematic plan diagram illustrating a context of a system.

Referring to FIG. 1, a schematic plan diagram illustrating a context of a system is shown in accordance with an exemplary embodiment. The system may implement a vehicle 80. The vehicle 80 may be surrounded by air (an atmosphere) 70. The vehicle 80 generally comprises a rechargeable energy storage system 90, a transmission 92, a fluid circuit 94, a harness 96 and an electric motor 100.

The vehicle 80 may include, but is not limited to, mobile objects such as automobiles, trucks, motorcycles, boats, trains and/or aircraft. In some embodiments, the vehicle 80 may include stationary objects such as power back-up systems and/or industrial machinery. Other types of vehicles 80 may be implemented to meet the design criteria of a particular application.

The rechargeable energy storage system 90 is generally operational to store energy used by the electric motor 100. In a charging mode, the rechargeable energy storage system 90 may receive electrical current from a generator and/or external source. In a discharging mode, the rechargeable energy storage system 90 may provide electrical current to the electric motor 100. The rechargeable energy storage system 90 may include multiple battery modules electrically connected in series and/or in parallel between a positive battery pack terminal and a negative battery pack terminal. In various embodiments, the rechargeable energy storage system 90 may provide approximately 200 to 1,000 volts DC (direct current) electrical potential between the positive battery pack terminal and the negative battery pack terminal. Other battery voltages may be implemented to meet the design criteria of a particular application. The rechargeable energy storage system 90 may be physically and electrically connected to the harness 96.

The transmission 92 is generally operational to transfer mechanical torque from the electric motor 100 to the wheels of the vehicle 80. In various embodiments, the transmission 92 may implement a geared transmission. In other embodiments, the transmission 92 may implement a continuously variable transmission.

The fluid circuit (or source) 94 is generally operational to provide a fluid to the electric motor 100. The fluid may be used to lubricate and/or cool the electric motor 100. In various embodiments, the fluid may be sprayed into the electric motor 100. In some embodiments, the electric motor 100 may sit in some amount of the fluid provided by the fluid circuit 94. In some embodiments, the fluid may be an oil and/or a coolant.

The harness 96 may be an electrical harness. The harness 96 is generally operational to carry electrical power between the rechargeable energy storage system 90 and the electric motor 100. In operation, the electrical power may flow along the harness 96 from the rechargeable energy storage system 90 to the electric motor 100.

The electric motor 100 may be a drive motor for the vehicle 80. The electric motor 100 is generally operational to provide rotation and torque to drive wheels of the vehicle 80. The electrical power consumed by the electric motor 100 may be provided by the rechargeable energy storage system 90. The electric motor 100 generally has a stator and a rotor separated by an airgap. The airgap may inadvertently accumulate the fluid. The rotor may be disposed within the stator, and separated from the stator by the airgap. A rotor shaft may be connected to the rotor. An air pump may be configured to force air into the airgap through the stator and/or the rotor. The air forced into the airgap generally pushes the unwanted fluid out of the airgap thereby reducing the drag on the electric motor 100. A kinetic pump may also be provided by the rotor and multiple grooves. The rotor and the grooves may impart an energy to the fluid parallel to the airgap thereby moving the fluid out one or both ends of the airgap.

Figure 2:
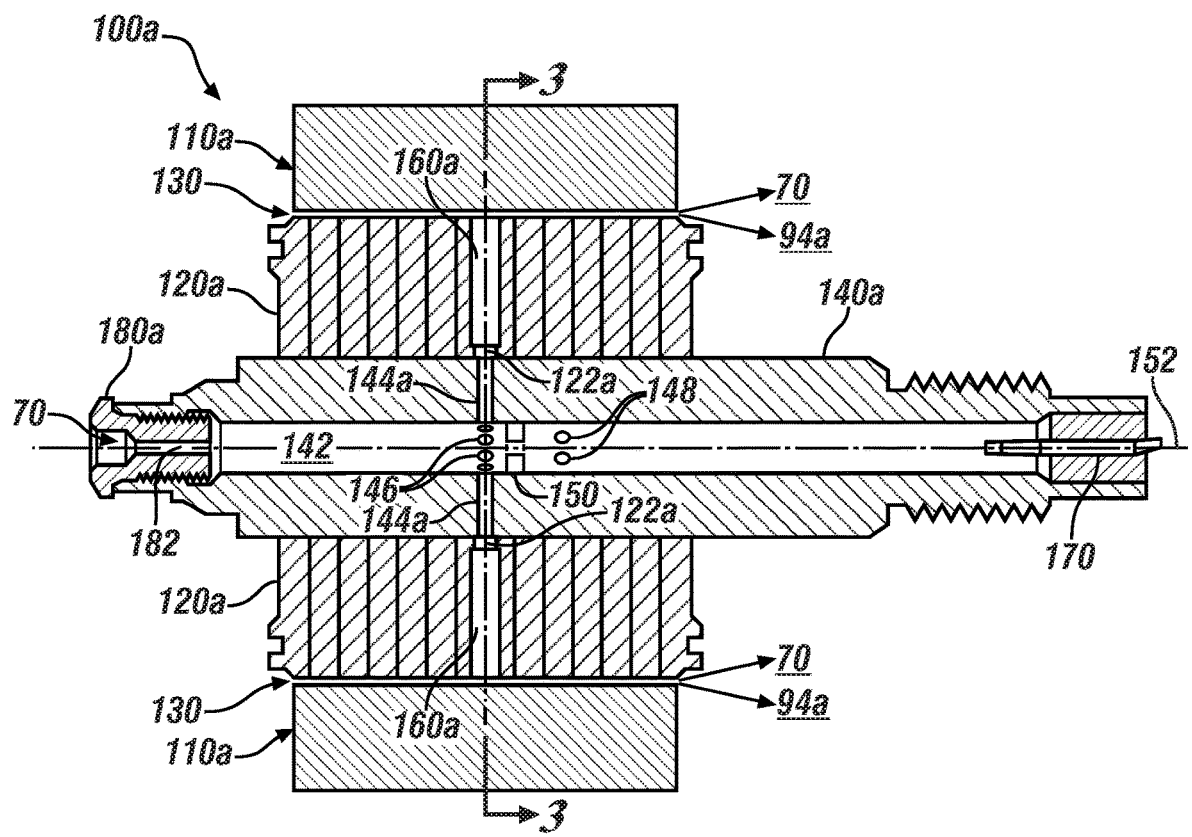
FIG. 2 is a schematic cross-sectional diagram of an example implementation of an electric motor in accordance with an exemplary embodiment.

Referring to FIG. 2, a schematic cross-sectional diagram of an example implementation of an electric motor 100a is shown in accordance with an exemplary embodiment. The electric motor 100a may be a variation of the electric motor 100. The electric motor 100a generally comprises a stator 110a, a rotor 120a, an airgap 130, a rotor shaft 140a, an air pump 160a, a feed nozzle 170 and an open cap 180a.

The stator 110a is generally operational to generate a rotating magnetic field. The stator 110a may include windings and multiple laminations extending inward toward the rotor 120a. An alternating current driven through the windings generally establishes the rotating magnetetic field.

The rotor 120a may include one or more rotor air lines 122a (multiple shown), and the air pump 160a. The rotor 120a is generally operational to convert the rotating magnetic field into mechanical rotation. The rotor 120a may include windings and multiple circular laminations. The rotor 120a may be connected to and rotate about the rotor shaft 140a.

The airgap 130 may provide a physical gap between an inside surface of the stator 110a and an outer surface of the rotor 120a. The airgap 130 generally accumulates fluid 94a unintentionally from the fluid circuit 94. In various embodiments, the fluid 94a may be moved, pushed, directed and/or blown out of the airgap 130 by the air 70 forced into the airgap 130. A size of the airgap 130 between the stator 110a and the rotor 120a may be less than a millimeter (mm). In some embodiments, the size of the airgap 130 may be less than 0.5 mm (e.g., 0.2 mm to 0.45 mm). Other sizes of the airgap 130 may be implemented to meet the design criteria of a particular design.

The rotor shaft 140a generally comprises an airway 142, at least one rotor shaft air line 144a (multiple shown), at least one air inlet 146a (multiple shown), at least one lubrication hole 148 (multiple shown) and a fluid dam 150. The rotor shaft 140a may transfer the mechanical torque generated by the rotor 120a to the transmission 92. The rotor shaft 140a generally spins about an axis of rotation 152. A hollow airway 142 generally extends along the axis of rotation 152 and allows passage of air 70 and/or fluid 94a through the rotor shaft 140a and into the rotor 120a. The rotor 120a may include the rotor air lines 122a. The rotor shaft air lines 144a may be aligned with and in fluid communication with the rotor air lines 122a. The rotor shaft air lines 144a generally provide fluid communication of the air 70 from the airway 142 through the air inlets 146 into the rotor air lines 122a. The lubrication holes 148 may provide fluid communication of the fluid 94a from the airway 142 into the rotor 120a. The fluid dam 150 may be disposed in the airway 142 to help reduce the amount of fluid 94a provided by the feed nozzle 170 from reaching the air pump 160a.

The air pump 160a may implement a centrifugal fan (or pump). The air pump 160a may be operational to force the air 70 (received through the airway 142, the rotor shaft air lines 144a and the rotor air lines 122a) into the airgap 130. The air pump 160a generally utilizes the rotation of the rotor 120a to accelerate the air 70 outward toward the airgap 130. The air pump 160a may be positioned approximately midway in the rotor 120a along the axis of rotation 152 (e.g., left to right as shown in the figure). Therefore, the air pump 160a may push the air 70 into the middle axially of the airgap 130, forcing the fluid 94a out either or both ends of the airgap 130.

The feed nozzle 170 is operational to introduce the fluid 94a into the airway 142 of the rotor shaft 140a. The feed nozzle 170 may be disposed at an end of the rotor shaft 140a opposite the open cap 180a.

The open cap 180a is disposed at an end of the airway 142 opposite the feed nozzle 170. The open cap 180a may include a passage 182 that allows the air 70 to be drawn into the airway 142 by the air pump 160a.

Air flowing through the rotor shaft 140a, the rotor 120a and the airgap 130 may provide cooling to the rotor 120a. The air flowing through the airgap 130 may also provide cooling for the stator 110a. In various embodiments, the airflow may be increased by implementing multiple air pumps 160a in the rotor 120a.

Figure 3:
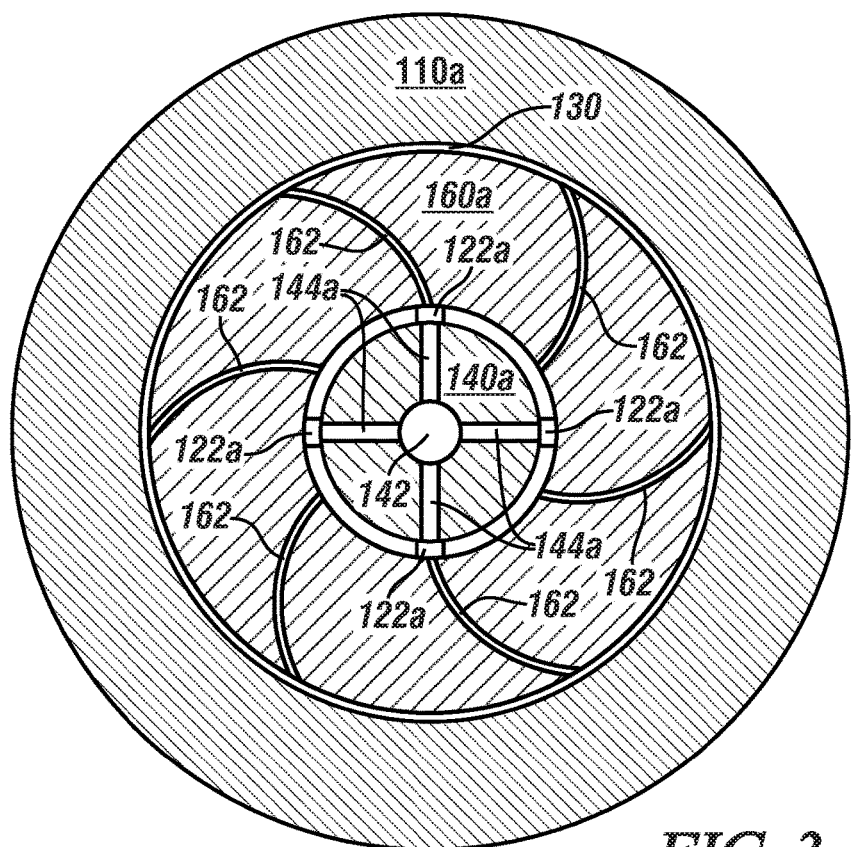
FIG. 3 is a schematic cross-sectional diagram of the electric motor in FIG. 2 along line 3-3 in accordance with an exemplary embodiment.

Referring to FIG. 3, a schematic cross-sectional diagram of an example implementation of the electric motor 100a along line 3-3 in FIG. 2 is shown in accordance with an exemplary embodiment. The air pump 160a generally includes one or more centrifugal blades 162 (multiple shown). As the air pump 160a rotates, the centrifugal blades 162 may force the air 70 received through the rotor air lines 122a radially outward toward the airgap 130.

Figure 4:
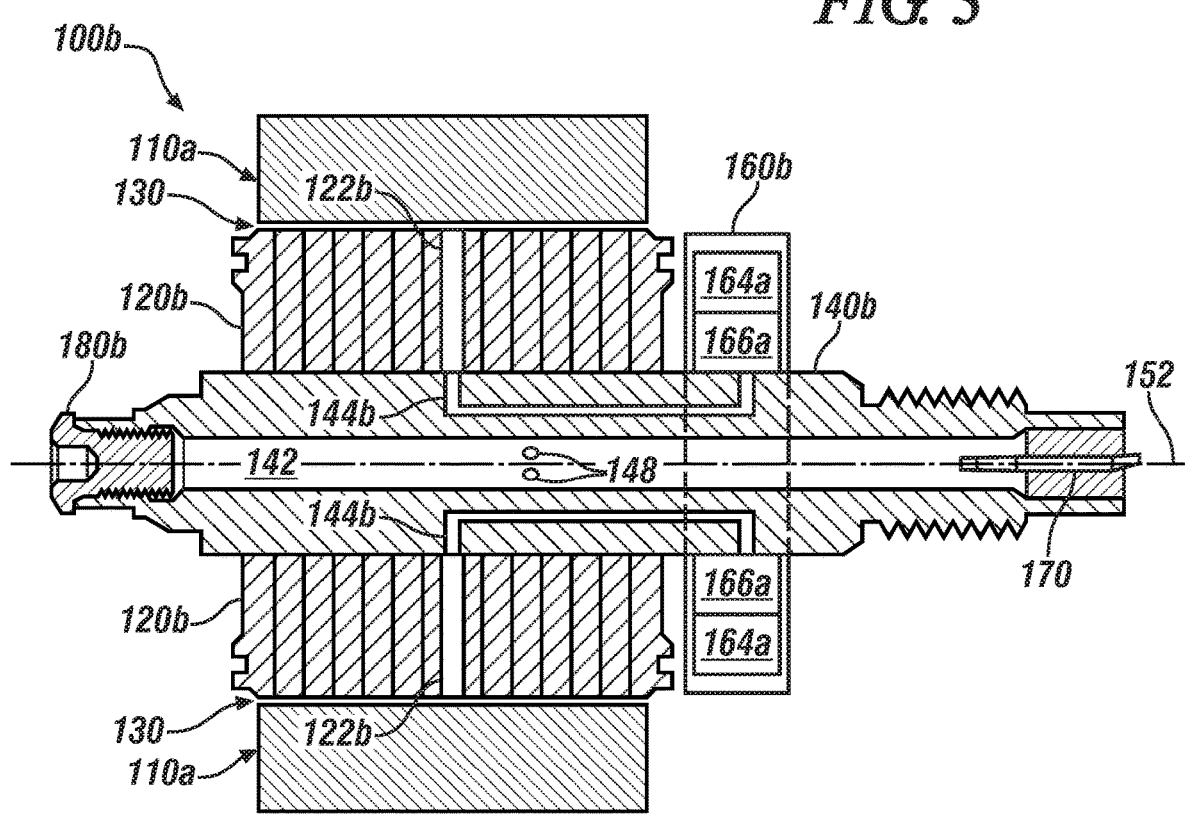
FIG. 4 is a schematic cross-sectional diagram of another electric motor in accordance with an exemplary embodiment.

Referring to FIG. 4, a schematic cross-sectional diagram of an example implementation of an electric motor 100b is shown in accordance with an exemplary embodiment. The electric motor 100b may be a variation of the electric motors 100 and/or 100a. The electric motor 100b generally comprises the stator 110a, a rotor 120b, the airgap 130, a rotor shaft 140b, an air pump 160b, the feed nozzle 170 and a closed cap 180b.

The rotor 120b may be a variation of the rotor 120a. The rotor 120b may include one or more rotor air lines 122b (multiple shown). The rotor air lines 122b may extend from an inside surface of the rotor 120b to an outside surface of the rotor 120b. The rotor air lines 122b may be in fluid communication with rotor shaft air lines 144b and the airgap 130. Air 70 received from the rotor shaft air lines 144b may be transferred through the rotor air lines 122b to the airgap 130. The rotor air lines 122b may be located approximately midway in the rotor 120b along the axis of rotation 152. Therefore, the air 70 being introduce at the middle of the airgap 130 may force the fluid 94a out either end of the airgap 130.

The rotor shaft 140b may be a variation of the rotor shaft 140a. The rotor shaft 140b generally comprises the airway 142, the at least one rotor shaft air line 144b (multiple shown), and the lubrication holes 148. The rotor shaft air lines 144b generally extend parallel to the axis of rotation 152 of the rotor shaft 140b. The rotor shaft air lines 144b may be in fluid communication between the air pump 160b and the rotor air lines 122b. Pressurized air 70 generated by the air pump 160b may be conveyed through the rotor shaft air lines 144b to the rotor air lines 122b and out to the airgap 130.

The air pump 160b may be a variation of the air pump 160a. The air pump 160b may implement a fixed displacement pump. The air pump 160b is operational to move air 70 received from outside the electric motor 100b through the rotor shaft air lines 144b and the rotor air lines 122b into the airgap 130. The air pump 160b may be located at either end of the rotor shaft 140b.

The air pump 160b generally comprises a stationary portion 164a and a rotating portion 166a. The stationary portion 164a may be physically connected to a frame of the electric motor 100b. The rotating portion 166a may be physically connected to the rotor shaft 140b. The air pump 160b generally utilizes the rotation of the rotor shaft 144b to pump the air 70 out of the rotating portion 166a.

The closed cap 180b may be a variation of the open cap 180a. The closed cap 180b may be a solid cap that seals the airway 142. As such, the fluid dam 150 implemented in the rotor shaft 140a may be eliminated from the rotor shaft 140b.

Figure 5:
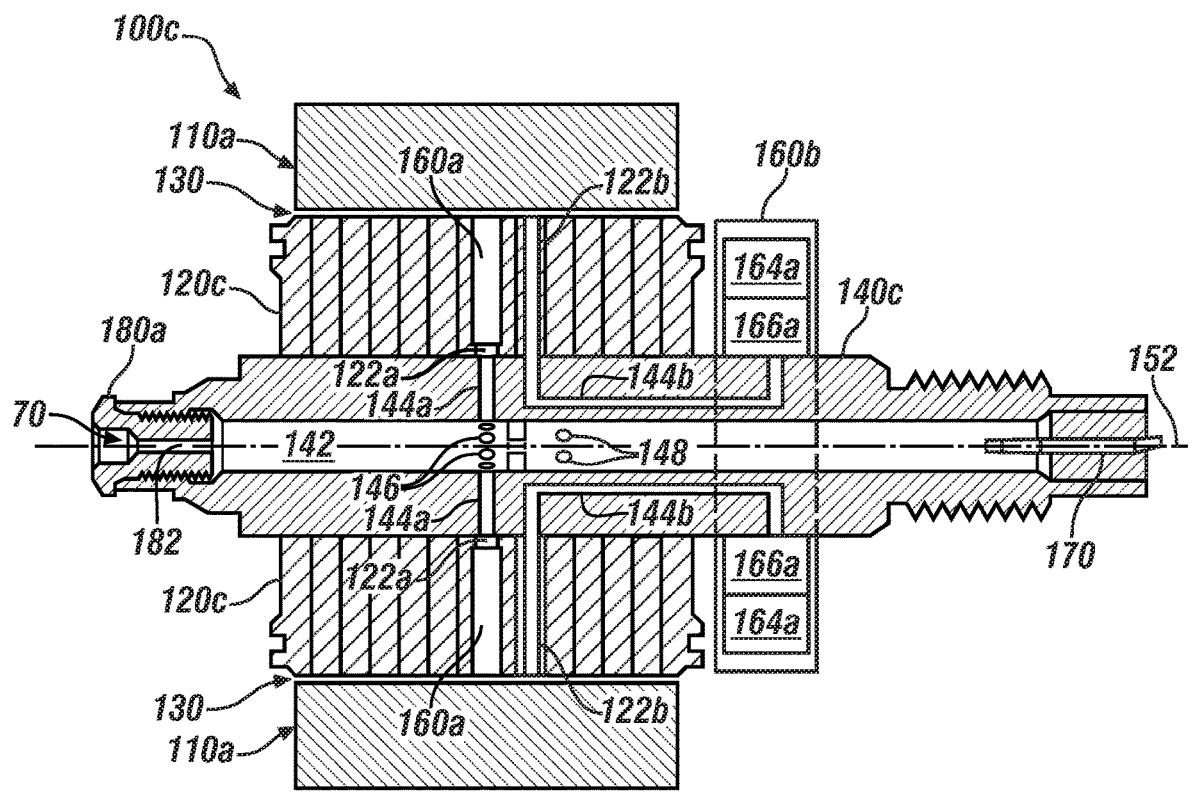
FIG. 5 is a schematic cross-sectional diagram of still another electric motor in accordance with an exemplary embodiment.

Referring to FIG. 5, a schematic cross-sectional diagram of an example implementation of an electric motor 100c is shown in accordance with an exemplary embodiment. The electric motor 100c may be a variation of the electric motors 100, 100a and/or 100b. The electric motor 100c generally comprises the stator 110a, a rotor 120c, the airgap 130, a rotor shaft 140c, the air pump 160a, the air pump 160b, the feed nozzle 170 and the open cap 180a.

The rotor 120c may be a variation of the rotors 120a and/or 120b. The rotor 120c may include the rotor air lines 122a, the rotor air lines 122b, and the air pump 160a. Air 70 received from the rotor shaft air lines 144a and 144b may be transferred through the rotor air lines 122b/air pump 160a and the rotor air lines 122b into the airgap 130.

The rotor shaft 140c may be a variation of the rotor shafts 140a and/or 140b. The rotor shaft 140c generally comprises the airway 142, the rotor shaft air lines 144a, the rotor shaft air line 144b, the air inlets 146, the lubrication holes 148 and the fluid dam 150. Motion of the rotor shaft 140c may drive the air pump 160b. Air 70 received from the air pump 160b may be conveyed through the rotor shaft air lines 144b to the rotor air lines 122b and out to the airgap 130.

Figure 6:
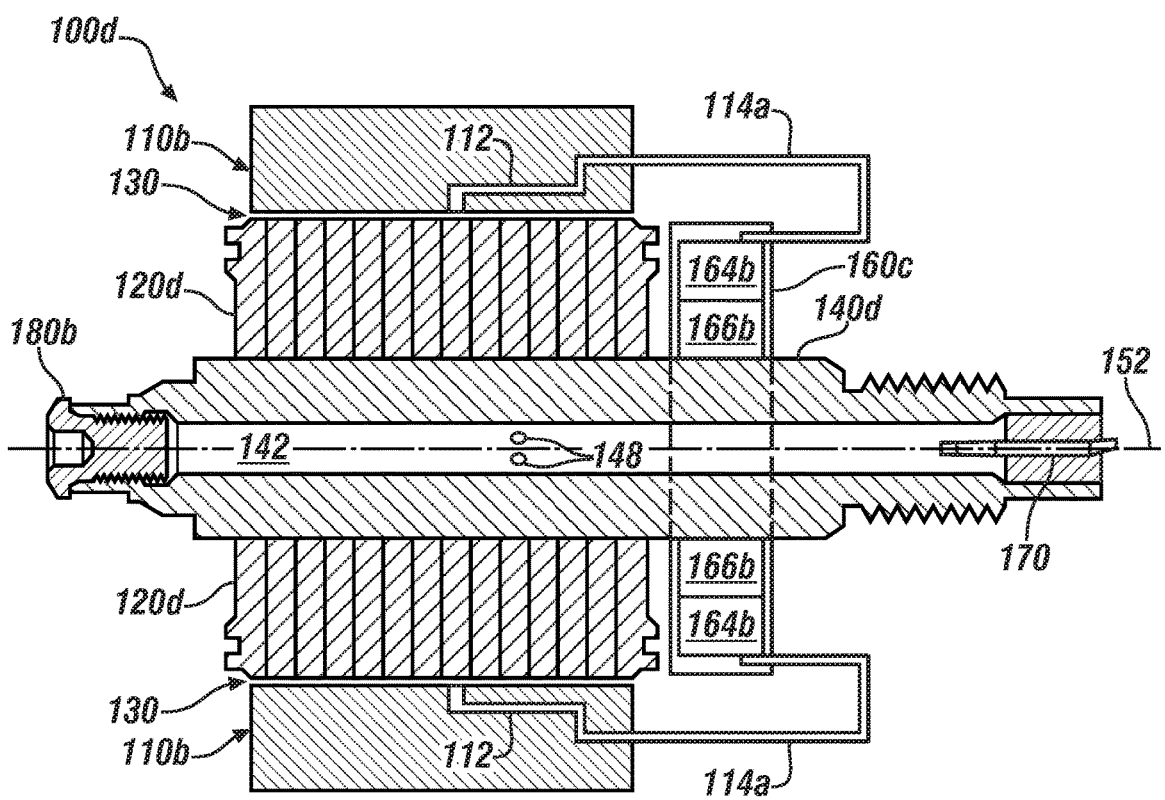
FIG. 6 is a schematic cross-sectional diagram of another electric motor in accordance with an exemplary embodiment.

Referring to FIG. 6, a schematic cross-sectional diagram of an example implementation of an electric motor 100d is shown in accordance with an exemplary embodiment. The electric motor 100d may be a variation of the electric motors 100, 100a, 100b and/or 100c. The electric motor 100d generally comprises a stator 110b, at least one pipe 114a (multiple shown), a rotor 120d, the airgap 130, a rotor shaft 140d, an air pump 160c, the feed nozzle 170 and the closed cap 180b.

The stator 110b may be a variation of the stator 110a. The stator 110b is generally operational to generate the rotating magnetic field. The stator 110b may include at least one stator air line 112 (multiple shown). The stator air lines 112 are generally operational to carry the air 70 pressurized by the air pump 160c to the airgap 130. The stator air lines 112 may be located approximately midway in the stator 110b along the axis of rotation 152 (e.g., left to right as shown in the figure).

The rotor 120d may be a variation of the rotors 120a, 120b and/or 120c. in various embodiments, the rotor 120d may lack rotor air lines in communication with the airway 142 and/or the air pump 160c.

The rotor shaft 140d may be a variation of the rotor shafts 140a, 140b and/or 140c. The rotor shaft 140d generally comprises the airway 142 and the lubrication holes 148. In some embodiments, the rotor shaft 140d may lack rotor shaft air lines from the airway 142 and/or the air pump 160c.

The air pump 160c may be a variation of the air pumps 160a and/or 160b. The air pump 160c may implement a fixed displacement pump. The air pump 160c is operational to move the air 70 received from outside the electric motor 100d through the pipe (or air line) 114a and the stator air lines 112 into the airgap 130. The air pump 160c may be located at either end of the rotor shaft 140d.

The air pump 160c generally comprises a stationary portion 164b and a rotating portion 166b. The stationary portion 164b may be physically connected to a frame of the electric motor 100d. The rotating portion 166b may be physically connected to the rotor shaft 140d. The air pump 160c generally utilizes the rotation of the rotor shaft 144d to pump the air 70 out of the stationary portion 164b.

Air flowing through the stator 110b and the airgap 130 may cool the stator 110b. The air flowing through the airgap 130 may also provide cooling for the rotor 120d.

Figure 7:
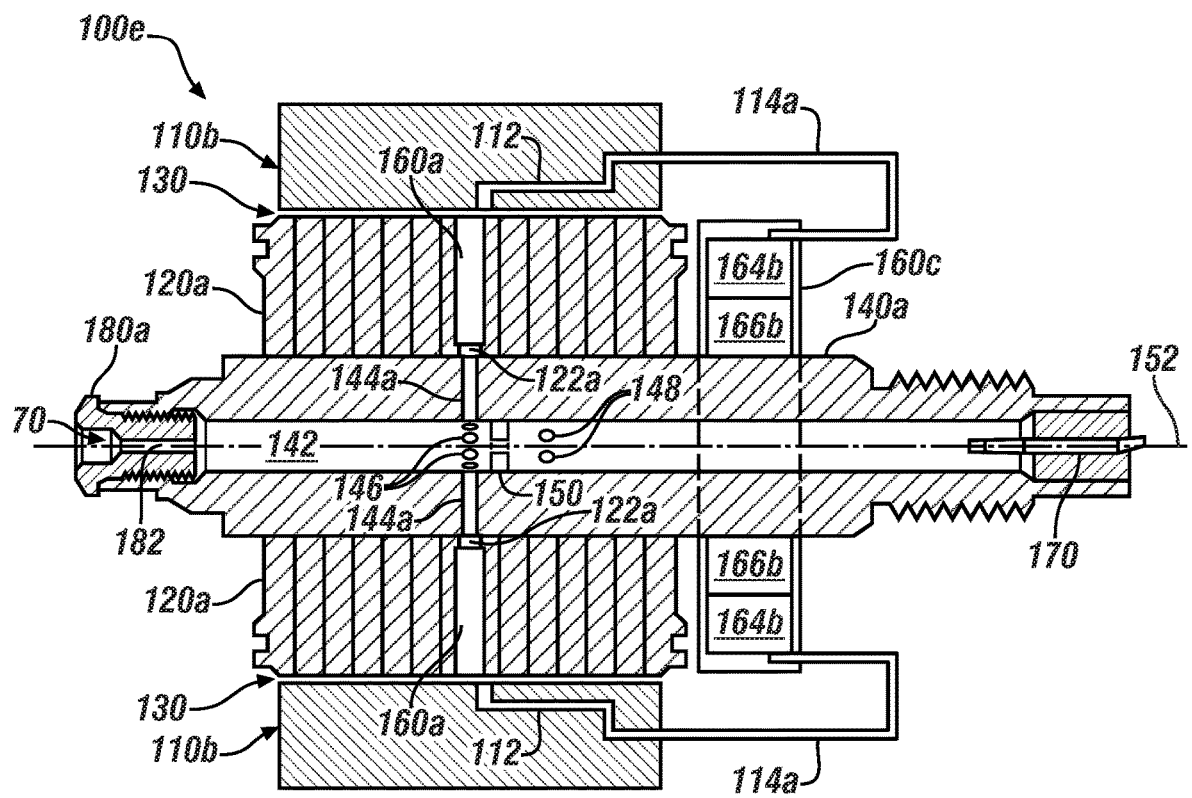
FIG. 7 is a schematic cross-sectional diagram of yet another electric motor in accordance with an exemplary embodiment.

Referring to FIG. 7, a schematic cross-sectional diagram of an example implementation of an electric motor 100e is shown in accordance with an exemplary embodiment. The electric motor 100e may be a variation of the electric motors 100, 100a, 100b, 100c and/or 100d. The electric motor 100e generally comprises the stator 110b, the pipe 114a, the rotor 120a, the airgap 130, the rotor shaft 140a, the air pump 160a, the air pump 160c, the feed nozzle 170 and the open cap 180a.

Implementation of both the air pump 160a and the air pump 160c may increase an amount of the air 70 pushed into the airgap 130. The increased air flow may help displace the fluid 94a from the airgap 130 at a higher rate than implementations with a single air pump 160a, 160b or 160c. The increase air flow may through the stator 110b and the rotor 120a may provide increased cooling of the stator 110b and the rotor 120a. Other numbers of air pumps 160a-c may be implemented to meet the design criteria of a particular application.

Figure 8:
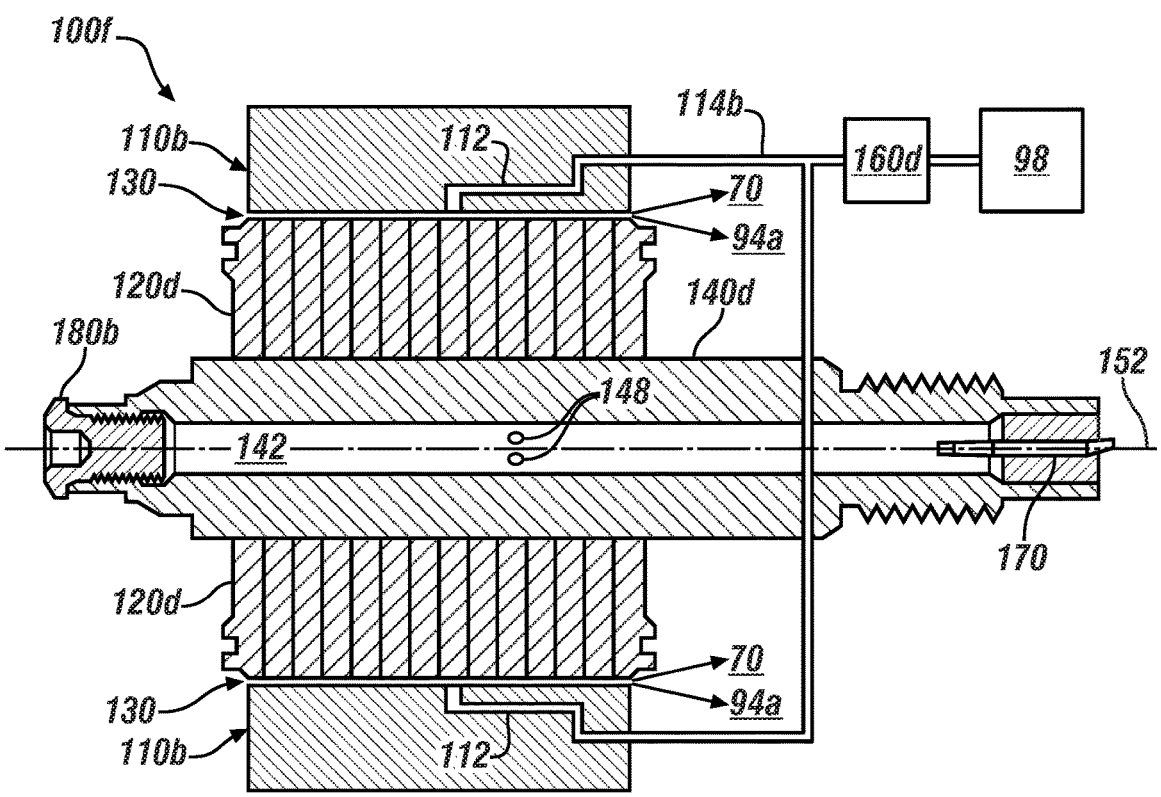
FIG. 8 is a schematic cross-sectional diagram of another electric motor in accordance with an exemplary embodiment.

Referring to FIG. 8, a schematic cross-sectional diagram of an example implementation of an electric motor 100f is shown in accordance with an exemplary embodiment. The electric motor 100f may be a variation of the electric motors 100, 100a, 100b, 100c, 100d and/or 100e. The electric motor 100f generally comprises a stator 110b, at least one pipe 114b (multiple shown), the rotor 120d, the airgap 130, the rotor shaft 140d, an air pump 160d, the feed nozzle 170 and the closed cap 180b. A compressor motor 98 may be attached to the air pump 160d.

The compressor motor 98 is generally operational to power the air pump 160d. In various embodiments, the compressor motor 98 may be another electric motor. The compressor motor 98 is generally powered by the rechargeable energy storage system 90.

The air pump 160d may be a variation of the air pumps 160a, 160b and/or 160c. The air pump 160d may implement an air compressor. The air pump 160d is operational to send the air 70 (received from outside the electric motor 100f through the pipe (or air line) 114b and the stator air lines 112 of the stator 110b into the airgap 130. In various embodiments, the air pump 160d may be located outside of, and operate independent of the electric motor 100f. In some embodiments, the air pump 160d may be located inside the electric motor 100f.

Is some designs, the air pump 160d may be implemented in conjunction with one or more of the other air pumps 160a, 160b and/or 160c. For example, the air pump 160a may be included in the design to force the air 70 into the airgap 130 through the rotor 120d while the air pump 160d sends air 70 into the airgap 130 through the stator 110b. Other numbers of air pumps 160a-d may be implemented to meet the design criteria of a particular application.

Figure 9:
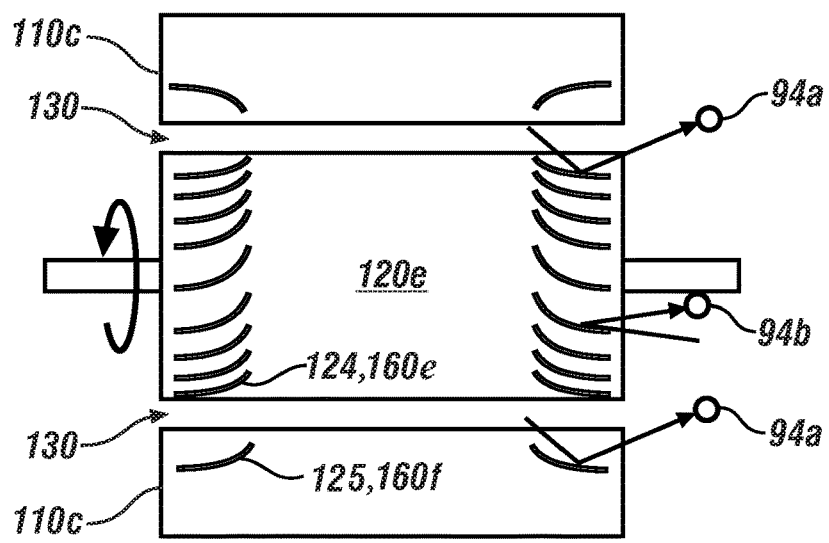
FIG. 9 is a schematic diagram of a stator and a rotor in accordance with an exemplary embodiment.

Referring to FIG. 9, a schematic diagram of an example implementation of a stator 110c and a rotor 120e is shown in accordance with an exemplary embodiment. The stator 110c may be a variation of the stator 110a and/or 110b. The rotor 120e may be a variation of the rotor 120a, 120b, 120c and/or 120d. The stator 110c and/or the rotor 120e may be implemented in any of the electric motors 100-100f. The rotor 120e may include multiple rotor grooves 124 located approximate one or both ends of the rotor 120e. The rotor grooves 124 may be spaced around an outer circumference of the rotor 120e. The rotor grooves 124 may move with the rotation of the rotor 120e.

A combination of the rotor 120e and the rotor grooves 124 may form a kinetic pump 160e. The kinetic pump 160e may be a type of axial-flow pump. The rotor grooves 124 of the kinetic pump 160e may be configured to operate as an axial impeller. The rotor grooves 124 may be curved to propel (or push or direct) the fluid 94a in the airgap 130 out of the airgap 130. External fluid 94b approaching the ends of the rotor 120e may also be deflected away from the rotor 120e (and thus the electric motor 100) by the rotor grooves 124.

In various embodiments, the stator 110c may include multiple stator grooves 125 located approximate one or both ends of the stator 110c. The stator grooves 125 may be formed around an inner surface of the stator 110c facing the airgap 130. A combination of the rotor 120e and the stator grooves 125 may form a kinetic pump 160f. The kinetic pump 160f may be a variation of the kinetic pump 160e. The kinetic pump 160f may be a type of viscous drag pump. The rotor 120e of the kinetic pump 160f may accelerate the fluid 94a toward the stator grooves 125. The curvature of the stator grooves 125 may redirect the fluid 94 along the airgap 130 to one or both ends where the air 70 and the fluid 94a are discharged from the airgap 130. Both the rotor grooves 124 and the stator grooves 125 may be implemented together. In various embodiments, the rotor grooves 124 may be implemented without the stator grooves 125. In other embodiments, the stator grooves 125 may be implemented without the rotor grooves 124.

Figure 10:
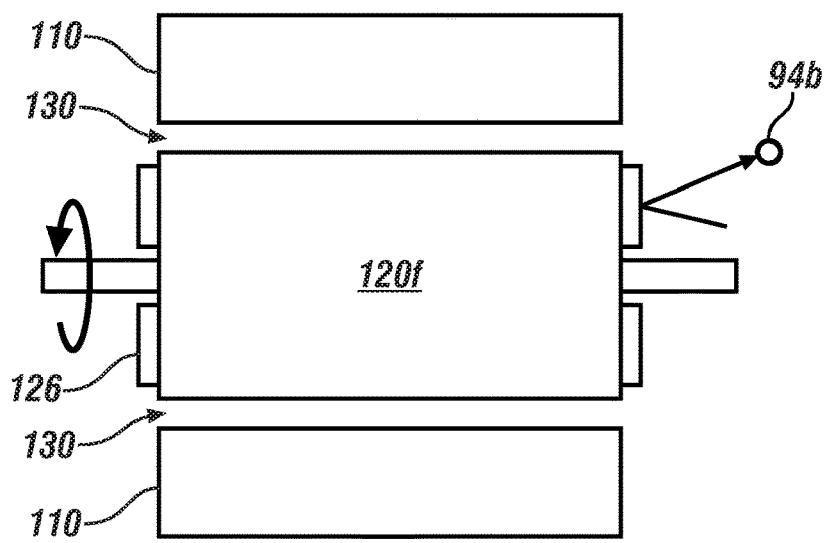
FIG. 10 is a schematic diagram of another rotor in accordance with an exemplary embodiment.

Referring to FIG. 10, a schematic diagram of an example implementation of a rotor 120f is shown in accordance with an exemplary embodiment. The rotor 120f may be a variation of the rotor 120a, 120b, 120c, 120d and/or 120e. The rotor 120f may be implemented in any of the electric motors 100-100f. The rotor 120f may include multiple rotor blades 126 located on one or both ends. The rotor blades 126 are generally moved by the rotation of the rotor 120f. The rotor blades 126 may be angled to propel (or push) the external fluid 94b approaching the ends of the rotor 120f away for the rotor 120f. In some embodiments, both the rotor grooves 124 and the rotor blades 126 may be implemented on the rotors 120a-f.

Figure 11:
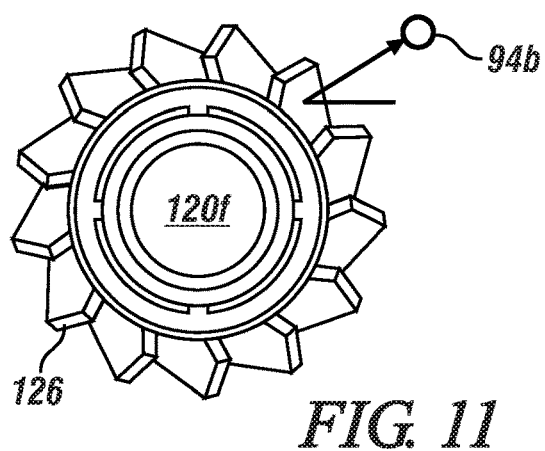
FIG. 11 is a schematic plain diagram of an end of the rotor in FIG. 10 in accordance with an exemplary embodiment.

Referring to FIG. 11, a schematic plain diagram of an end of the rotor 120f is shown in accordance with an exemplary embodiment. As the rotor 120f rotates, the rotor blades 126 may sweep the approaching fluid 94b away from the rotor 120f. The rotor blades 126 may also create an air flow near the ends of the rotor 120f away from the rotor 120f and the airgap 130. The airflow may assist in keeping the fluid 94b from entering at the open ends of the airgap 130.

Implementations of one or more air pumps may reduce drag on the electric motor by pushing the air into the airgap. Removal of some or most of the fluid from the airgap generally decreases shear that results in loss of power. An additional benefit of injecting the air into the rotor and/or the stator may be additional cooling of the rotor and/or stator. Implementations of one or more kinetic pumps may also reduce drag on the electric motor by moving some or most of the fluid out of the airgap. Removal of the fluid from the airgap generally decreases the shear results in the loss of power.

While the best modes for carrying out the disclosure have been described in detail, those familiar with the art to which this disclosure relates will recognize various alternative designs and embodiments for practicing the disclosure within the scope of the appended claims.

What is claimed is:

1. An electric motor comprising:
   a stator;
   a rotor disposed within the stator, and separated from the stator by an airgap, wherein the airgap inadvertently accumulates a fluid;
   a rotor shaft connected to the rotor, and defining an airway and a plurality of lubrication holes in fluid communication between the airway and the rotor;
   a feed nozzle at one end of the airway, wherein the feed nozzle, the airway, and the lubrication holes are configured to transfer the fluid from external to the electric motor into the rotor; and
   a pump configured to draw air from an atmosphere outside the electric motor and push the air into the airgap to push the fluid out of the airgap.

2. The electric motor according to claim 1, wherein the pump is an air pump configured to force the air into the airgap through the rotor to push the fluid out of the airgap back into the atmosphere.

3. The electric motor according to claim 1, wherein the pump is an air pump configured to force the air into the airgap through the stator to push the fluid out of the airgap back into the atmosphere.

4. The electric motor according to claim 1, wherein the pump is driven by the rotor.

5. The electric motor according to claim 1, wherein:
   the rotor further comprises a plurality of rotor grooves disposed around an outer circumference of the rotor proximate at least one end of the rotor;
   the pump comprises a kinetic pump formed by the rotor and the plurality of rotor grooves; and
   the plurality of rotor grooves are configured to move the fluid out of the airgap.

6. The electric motor according to claim 1, wherein:
   the stator comprises a plurality of stator grooves disposed around an inner surface of the stator proximate at least one end of the stator;
   the pump comprises a kinetic pump formed by the rotor and the plurality of stator grooves; and
   the plurality of stator grooves are configured to move the fluid out of the airgap.

7. The electric motor according to claim 1, wherein:
   the rotor further comprises a plurality of rotor blades disposed on at least one end of the rotor proximate the airgap; and
   the plurality of rotor blades are configured to push the fluid approaching from external to the electric motor away from the electric motor.

8. The electric motor according to claim 1, wherein the fluid comprises an oil.

9. The electric motor according to claim 1, wherein the electric motor forms part of a vehicle.

10. An electric motor comprising:
    a stator;
    a rotor disposed within the stator, and separated from the stator by an airgap, wherein the airgap inadvertently accumulates a fluid;

a rotor shaft connected to the rotor, and defining an airway and a plurality of lubrication holes in fluid communication between the airway and the rotor;

a feed nozzle at one end of the airway, wherein the feed nozzle, the airway, and the lubrication holes are configured to transfer the fluid from external to the electric motor into the rotor; and an air pump configured to draw air from an atmosphere outside the electric motor and force the air into the airgap, wherein the air forced into the airgap pushes the fluid out of the airgap.

11. The electric motor according to claim 10, wherein the air pump comprises a centrifugal fan disposed in the rotor, in fluid communication between the airway of the rotor shaft and the airgap, and configured to force the air from the airway of the rotor shaft into the airgap.

12. The electric motor according to claim 10, wherein:
the rotor has at least one rotor air line in fluid communication between the airway of the rotor shaft and the airgap; and
the air pump comprises a fixed displacement pump driven by the rotor shaft, in fluid communication with the airway of the rotor shaft, and configured to force the air through the airway of the rotor shaft and the at least one rotor air line of the rotor into the airgap.

13. The electric motor according to claim 10, wherein:
the stator comprises at least one stator air line in fluid communication with the airgap; and
the air pump comprises a fixed displacement pump driven by the rotor shaft, in fluid communication with the at least one stator air line, and configured to force the air through the at least one stator air line of the stator into the airgap.

14. The electric motor according to claim 10, wherein:
the rotor has at least one rotor air line in fluid communication with the airgap;
the rotor shaft has an axis of rotation, at least one rotor shaft air line radially displaced from the axis of rotation, and the at least one rotor shaft air line is in fluid communication with the at least one rotor air line; and
the air pump comprises a fixed displacement pump driven by the rotor shaft, in fluid communication with the rotor shaft air line, and configured to force the air through the at least one rotor shaft air line of the rotor shaft and the at least one rotor air line of the rotor into the airgap.

15. The electric motor according to claim 10, wherein the electric motor forms part of a vehicle, and the fluid comprises an oil.

16. An electric motor comprising:
a stator;
a rotor disposed within the stator, and separated from the stator by an airgap, wherein the airgap inadvertently accumulates a fluid;
a rotor shaft connected to the rotor, and defining an airway and a plurality of lubrication holes in fluid communication between the airway and the rotor;
a feed nozzle at one end of the airway, wherein the feed nozzle, the airway, and the lubrication holes are configured to transfer the fluid from external to the electric motor into the rotor; and
a kinetic pump driven by the rotor shaft, and configured to draw air from an atmosphere outside the electric motor and push the air into the airgap to push the fluid out of the airgap.

17. The electric motor according to claim 16, wherein:
the kinetic pump is formed by the rotor and a plurality of rotor grooves;
the plurality of rotor grooves are disposed around a circumference of the rotor proximate at least one end of the rotor; and
the plurality of rotor grooves are configured to move the fluid out of the airgap while the rotor is rotating.

18. The electric motor according to claim 16, wherein:
the kinetic pump is formed by the rotor and a plurality of stator grooves;
the plurality of stator grooves are disposed around an inner surface of the stator proximate at least one end of the stator; and
the plurality of stator grooves are configured to move the fluid out of the airgap while the rotor is rotating.

19. The electric motor according to claim 16, wherein:
the rotor further comprises a plurality of rotor blades, disposed on at least one end of the rotor proximate the airgap; and
the plurality of rotor blades are configured to push the fluid approaching from external to the electric motor away from the electric motor while the rotor is rotating.

20. The electric motor according to claim 16, wherein the electric motor forms part of a vehicle, and the fluid comprises an oil.

* * * * *